United States Patent [19]

Stevenson et al.

[11] Patent Number: 5,174,873
[45] Date of Patent: Dec. 29, 1992

[54] METHOD OF ISOTOPE ENRICHMENT

[75] Inventors: Gerald R. Stevenson; Matthew P. Espe, both of Normal; Richard C. Reiter, Bloomington, all of Ill.

[73] Assignee: Illinois State University, Normal, Ill.

[21] Appl. No.: 672,141

[22] Filed: Mar. 18, 1991

Related U.S. Application Data

[63] Continuation of Ser. No. 947,683, Dec. 30, 1986, abandoned, which is a continuation-in-part of Ser. No. 826,568, Feb. 5, 1986, Pat. No. 4,849,075.

[51] Int. Cl.$^5$ ............................................. B01D 5/00
[52] U.S. Cl. .................................. 204/157.2; 204/1.5; 423/6; 423/249
[58] Field of Search ........................ 204/157.2, 1.5; 423/249, 6

[56] References Cited

U.S. PATENT DOCUMENTS

| | | | |
|---|---|---|---|
| 4,399,011 | 8/1983 | Hsu et al. | 204/157.2 |
| 4,612,097 | 9/1986 | Jackovitz et al. | 204/157.2 |
| 4,748,008 | 5/1988 | Takeda et al. | 423/6 |
| 4,801,365 | 1/1989 | Rich et al. | 204/157.2 |
| 4,803,057 | 2/1989 | Takeda | 423/6 |
| 4,849,075 | 7/1989 | Stevenson et al. | 423/6 |

OTHER PUBLICATIONS

Knochel, A. et al.; "Isotopic Shifts in Chemical Exchange Systems . . . ", J. Am. Chem. Soc. 1981, 103, 5707–5711.
Heumann, K. G. et al.; "Calcium Isotope Separation on an Exchange Resin Having Cryptand Anchor Groups", Agnew. Chem. Int. Ed. Engl.; 19:5, 406–407.
Sessions, R. B.; "Crown Ethers and Cryptands"; McGraw-Hill Encyclopedia of Chemistry, ed. Parker, S. P.; 1983; New York; 235–238.
Lawler, R. G. et al., "Relative Stabilites of Alkylbenzene Negative Ions"; J. Amer. Chem. Soc.; 91:20, 1969, 5671–5672.
Jordan, K. D.; "The Relative Stability of Alkyl-Substituted Benzene Anions in the Gas Phase"; J. Amer. Chem. Soc.; 98:5; 1976; 1295–1296.
Stevenson, G. R. et al.; "Enthaply of Steric Inhibition to Solvation Due to Tert-Butyl Groups on an Anion Radiacal", J. Amer. Chem. Soc.; 103:22; 1981; 6558–6562.
Stevenson, G. R. et al.; "Diminished Solution Electron Affinities of $^{13}C$-and Deuterium-Substituted Anion Radical Precursors Allow Isotope Enrichment"; J. Amer. Chem. Soc.; 108; 1986; 532–533.
Stevenson, G. R. et al.; "Isotopic Enrichments via Altered First and Second Solution Electron Affinities"; J. Amer. Chem. Soc.; 108:19; 1986, 5760–5762.
Stevenson, G. R. et al.; "Enhancement of Radio-Activity of $^{14}C$–$^{12}C$ Mixtures via Partial Reduction"; J. Amer. Chem. Soc.; 108; 1986, 5366.
Stevenson G. R. et al.; "Isotopic Enrichment by Electron Exchange"; Nature; 323; 1986; 522–523.
Peterson, I.; "Separating Isotopes by Switching Electrons"; Science News; 130, 292.

*Primary Examiner*—Donald P. Walsh
*Assistant Examiner*—Ngoclan T. Mai
*Attorney, Agent, or Firm*—Lundy & Associates

[57] ABSTRACT

A method of isotope enrichment including providing a reactant. The reactant is a mixture of at least two isotopic compounds. One of the isotopic compounds has a greater percentage of a selected isotope than the other. An electron transfer agent is introduced into the reactant isotopic mixture to form a reaction mixture. The electron transfer agent facilitates transfer of electrons interactive with one or more selected nuclei of the reactant. The electron transfer agent is in an amount sufficient upon reaction of the reaction mixture to establish an equilibrium between an electron rich reaction product and an electron poor reaction product. The reaction mixture is reacted until the equilibrium is established. The electron poor reaction product is then separated from the electron rich reaction product.

51 Claims, No Drawings

METHOD OF ISOTOPE ENRICHMENT

This is a continuation of co-pending application Ser. No. 947,683 filed on Dec. 30, 1986 now abandoned, which is a c-ip of 826,568, filed Feb. 5, 1986, now U.S. Pat. No. 4,849,075.

BACKGROUND OF THE INVENTION

This invention relates to methods of separating isotopes of an element and in particular to a method of isotope enrichment by separation of an electron rich reaction product from an electron poor reaction product.

An isotope is one of two or more kinds of atoms of an element, which have different mass numbers, that is different numbers of neutrons in their nuclei, but the same number of protons. For example hydrogen has three isotopes $H^1$, $H^2$ (deuterium), and $H^3$ (tritium).

In this application, "isotopic compound" shall refer to one or more molecules or atoms or other species of a compound or element which differ from other molecules or atoms or other species of that compound or element in composition of isotopes of a selected element at a selected nucleus or nuclei. For example, in a compound which has only one selected atom of an element of interest per molecule and only one possible isomer of the molecule, the number of isotopic compounds would equal the number of different isotopes of the element present. If there was more than one atom of a selected element per molecule and/or more than one possible isomer, the number of isotopic compounds would be increased by the various possible combinations of different isotopes present and/or different locations of those isotopes in the molecules of the reactant.

In this application, "anion" shall refer to a negative ion of any charge. In this application "cation" shall refer to a positive ion of any charge. In this application, the terms "electron rich reaction product" and "electron poor reaction product" are used to describe two species or two groups of species which differ as a result of electron transfer and to describe, where appropriate, stable derivatives of transitory species of either or both reaction products.

In this application, a transfer of an electron also includes a transfer of charge in an amount equivalent or roughly equivalent to the charge on an electron.

Various procedures have been used to separate isotopes of elements. In diffusion procedures, isotopes incorporated in gases are allowed to diffuse, across a barrier under pressure or across a thermal gradient. Phase related separation procedures are based on an equilibrium between two phases such as gas and liquid. Electrolysis has been used as an isotope separation procedure at least for the production of heavy water. Electromagnetic processes separate ions of isotopes in the same manner as a mass spectrometer. Centrifugation separates isotopes on the basis of mass. Laser procedures separate isotopes by an excitation process followed by electromagnetic separation. Chromatographic procedures separate isotopic species on the basis of differential passage through a chromatographic medium such as a high pressure liquid chromatographic column. Within the column the isotopic species exchange between a fixed phase and a mobile phase at different rates.

These procedures generally have limited applicability, and are involved, time consuming and expensive.

It is therefore highly desirable to provide an improved method of isotope enrichment.

It is also highly desirable to provide an improved method of isotope enrichment that requires a limited amount of equipment.

It is further highly desirable to provide an improved method of isotope enrichment that has general applicability to separation of isotopes of a large number of elements.

It is also highly desirable to provide an improved method of isotope enrichment that can be relatively fast and relatively inexpensive.

It is finally highly desirable to provide a method of isotope enrichment which provides all of these desired features.

SUMMARY OF THE INVENTION

It is therefore a preliminary object of this invention to provide an improved method of isotope enrichment.

It is also an object of this invention to provide an improved method of isotope enrichment that requires a limited amount of equipment.

It is another object of the invention to provide an improved method of isotope enrichment that has general applicability to separation of isotopes of a large number of elements.

It is also a purpose of this invention to provide an improved method of isotope enrichment that is relatively fast and relatively inexpensive.

It is finally also a purpose of this invention to provide an improved method of isotope enrichment which provides all of the above indicated objects.

In the broader aspects of this invention there is provided a method of isotope enrichment which includes: providing a reactant. The reactant is a mixture of at least two isotopic compounds of a reactant, one of the compounds having a greater percentage of a selected isotope than the other. An electron transfer agent is introduced into the reactant isotopic mixture to form a reaction mixture. The electron transfer agent facilitates the transfer of electrons interactive with one or more selected nuclei of the reactant. The electron transfer agent is in an amount sufficient upon reaction of the reaction mixture to establish an equilibrium between an electron rich reaction product and an electron poor reaction product. The reaction mixture is reacted until the equilibrium is established. The electron poor reaction product is then separated from the electron rich reaction product.

DESCRIPTION OF A SPECIFIC EMBODIMENT

In the method of isotope enrichment or separation of the invention an electron transfer agent is introduced into a mixture of a reactant containing at least two different isotopic compounds of a selected element to form a reaction mixture, which is then reacted to equilibrium. The electron transfer agent is in an amount sufficient to establish an equilibrium between an electron rich reaction product and an electron poor reaction product. For example in one embodiment of the method of the invention, the electron rich reaction product would be relatively reduced and the electron poor reaction product relatively unreduced.

The electron rich reaction product is a mixture of at least two isotopic compounds. The electron poor reaction product is a mixture of at least two isotopic compounds. The equilibrium between the electron rich reaction product and the electron poor reaction product is composed of equilibria between each electron rich reaction product and each electron poor reaction product of each isotopic compound of the reactant. In one preferred embodiment of the method of the invention, the equilibrium between the electron rich reaction product and the electron poor reaction product can be represented by the formulas:

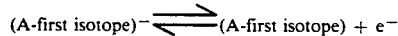

and:

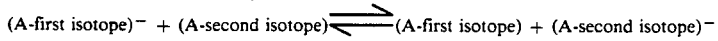

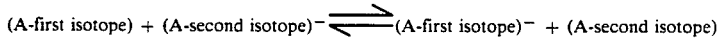

After the equilibrium is established the electron poor reaction product and the electron rich reaction product are separated.

The method of the invention provides a process for separating different isotopes of an element. The process can be applied to naturally occuring mixtures of isotopes or enriched mixtures. The method provides at least two fractions of product: fraction enriched in a selected isotope and a fraction depleted in a selected isotope. For example, the mixture of isotopic compounds of the electron poor reaction product of an embodiment of the method of the invention might be enriched in a selected isotope and the mixture of isotopic compounds of the electron rich reaction product of that embodiment depleted in that isotope. Further enrichment of the enriched fraction by the method of the invention is possible, although it may be necessary to reconstitute the reactant before continuing. It is believed that the method of the invention is applicable to most or a great many elements.

The method of the invention may be carried out at least through the reacting step in gas, liquid, or solid phase. The examples include the method of the invention carried out in each of these phases. Where air would interfere with the method of the invention the method of the invention must be carried out under vacuum or inert atmosphere.

The method of the invention may be carried out in solution. In that case, the method of the invention includes the step of solubilizing the mixture of isotopic species of the reactant. The method may include disbursing the reactant prior to solubilizing or by solubilizing or otherwise. There are few limitations on the choice of a solvent; one limitation on the solvent is that it not cause side reactions with the reactant or the reaction products which would prevent the reaction or destructively interfere with the equilibrium. For example, if the electron transfer agent is a reducing agent, liquid sulfur dioxide and strong Lowry-Bronsted acids would not be preferred solvents.

The compound chosen as a reactant for the method of the invention depends upon the element of interest and the desired reaction product. In an embodiment of the invention, the compound must be bonded or capable of being bonded to the selected element such that electrons interactive with the nucleus of the selected element can be transferred by an electron transfer agent. In an embodiment of the invention an element of interest is bonded in the reactant at a selected site in the molecule by bonding which exhibits covalence; such bonding includes covalent bonds and bonds that can be described as having some covalent character. Such reactants may be described under the molecular orbital method or theory as having delocalized molecular orbitals which include atomic orbitals of a selected atom. An alternative description which may be applied to reactants in an embodiment of the method of the invention, is that the reactants, such as, for example, conjugated compounds, exhibit resonance under the valence bond method or theory.

The reactant is not limited to a mixture of isotopic compounds of one compound or element but may include a mixture of isotopic compounds of two or more different compounds or elements, preferably with similar electron affinities. The reactant of the method of the invention need not be a stable compound but can instead be a reaction intermediate such as a free radical.

It is preferable that the reactant of the method of the invention not be a Lowry-Bronstead acid since protons of such acids interfere with electron transfer, but the reactant may be a Lewis acid.

In an embodiment of the method of the invention the reactant is a hydrocarbon having a saturated portion and an unsaturated portion and the atoms of the selected element, carbon or hydrogen, are in proximity to the unsaturated portion.

Space does not permit a list all the classes of compounds that could be used as reactants or could supply the reactant as a reaction intermediate, however some of the classes are the following: polyaromatics; acetylenes; nitroaromatics; aldehydes; conjugated ketones; aromatic amines; quinones; carboxylic esters; metallocenes such as ferrocene and ferrocene analogues containing osmium, manganese, chromium, ruthenium or cerium; lactones; annulenes; nitriles; boronitroxides; conjugated alkenes; cyclopentadiene metalnitroxides containing nickel, palladium or platinum; esters; organophosphorus; metallocarbonyls such as cyclopentadiene metalcarbonyls containing manganese, or molybdenum, and arene metal carbonyls like cot molybdenum tricarbonyl, or cot metal tricarbonyls containing chromium, cobalt, or tungsten; organometallics; heterocycles; steroids; conjugated silicons; sulfones; fluorocarbons; sulfoxides; bis arenes such as bis benzene chromium, bis benzene dichlorotitanium and mixed bis arenes.

In the method of the invention an electron transfer agent is introduced into the mixture to form a reaction mixture. The electron transfer agent may be any agent that facilitates the transfer of electrons interactive with the selected nuclei, to or from the reactant. In some embodiments of the method of the invention the transferred electrons are interactive with $\pi$ molecular orbitals of the reactant.

The electron transfer agent can be an electrolytic current, a reducing agent, or an oxidizing agent. It is not possible to list all possible electron transfer agents, however examples of possible classes of reducing agents are: alkali metals, alkaline earth metals, and strong electron donating bases such as hydroxides, alkoxides, alkyllithium and naphthalenides or mixtures of reducing agents. Examples of oxidizing agents are oxidizing acids such as sulfuric acid, and nitric acid and strong Lewis acids such as aluminum chloride, aluminum bromide, gallium chloride, bromic acid, antimony pentafluoride, antimony pentachloride, or mixtures of oxidizing agents.

The electron transfer agent is added in an amount sufficient to transfer a significant number of electrons but insufficient to drive the reaction of the method to completion. The electron transfer agent is preferably in an amount sufficient to establish an equilibrium between a substantial amount of an electron rich reaction product and a substantial amount of an electron poor reaction product.

In a preferred embodiment of the invention the number of electrons transferred is sufficient to provide a calculated ratio of electron rich reaction product to electron poor reaction product of between about 2:1 and 1:2. In another preferred embodiment of the method of the invention, the ratio of electron rich reaction product to electron poor reaction product is between about 2:3 and 3:2. In another preferred embodiment of the method of the invention, the ratio of electron rich reaction product to electron poor reaction product is about 1:1.

The reactant may become the electron rich reaction product or the electron poor reaction product depending upon the reaction performed. Each isotopic compound in the mixture of the reactant will participate in the equilibrium between electron rich reaction product and electron poor reaction product. The electron rich reaction product and the electron poor reaction product can be in a variety of forms, for example: neutral molecule and cation, anion and neutral molecule, neutral radical and cation, neutral molecule and cation radical, anion and neutral radical, anion radical and neutral molecule.

The reaction of the reaction mixture is carried out until the equilibrium is established. The reaction must transfer electrons to or from the reactant depending on the reactant used and the reaction products sought. An oxidation-reduction reaction is a preferred reaction. As is indicated by the statement that an equilibrium is established between the electron rich reaction product and the electron poor reaction product, the reaction products must remain in a form during the reaction such that the equilibrium can be established between them. The reaction thus must be "reversible" and the electron rich reaction product and the electron poor reaction product stable enough to allow the establishment of the equilibrium. Thus, for example, a reaction in which one of the reaction products was removed, such as by fast precipitation, would not be preferred.

After the equilibrium is established between the electron rich reaction product and the electron poor reaction product the electron rich reaction product is separated from the electron poor reaction product. Reactivities of electron rich forms of compounds and electron poor forms of compounds vary greatly, particularly where one of the forms is a radical or ionic and the other is not. This difference in reactivities may be used to preferentially react either the electron rich reaction product or the electron poor reaction product. The reaction products may also be separated by methods that rely on other differences between the electron poor reaction product and the electron rich reaction product, such as differences in charge or volatility.

The separation of the electron poor reaction product and the electron rich reaction product results in a separation of the selected isotopes. An enrichment of a selected isotope over another non-selected isotope of the selected element is present in either the electron poor reaction product or the electron rich reaction product.

In an embodiment of the invention in which the electron transfer agent would be a crown ether compound ion, the one reaction product would be an ion and the other reaction product would be a neutral or nearly neutral species of a Group Ia or IIa element, enclosed by a neutral or substantially neutral crown ether compound species.

The method of the invention may provide more than one enrichment at the same time. Besides providing a primary enrichment of a desired isotope at a desired site in the product molecule, the method of the invention may also provide one or more additional secondary enrichments.

Where more than two isotopes of a particular element of interest are present in a reactant, the method of the invention may besides increasing the relative abundance of a desired isotope in comparison to undesired isotopes also change the relative abundance of the undesired isotopes in comparison to each other. Similarly where an element of interest is present at more than one site in the reactant, the method of the invention may provide an actual or relative enrichment of one or more isotopes at one or more sites. The same thing applies to the other atoms. The method of the invention may provide an actual or relative enrichment of one or more isotopes of any or all of the atoms of the reaction product.

The method of the invention thus does not produce, in general, a reaction product having isotopically homogeneous molecules, but rather a mixture of different isotopic compounds, chiefly enriched in a particular site, but also slightly enriched or depleted in other isotopes of the same or different atoms of the molecule. The products of the embodiments of the method of the invention may thus have characteristic mixtures of isotopic compounds.

A theoretical explanation of what is occuring in the method of the invention can be provided, however, the invention is not limited by theory. Substitution of one isotope by another in the reactant of the method of the invention substantially alters the electron affinity and ionization potential and oxidation potential and the equilibria between each electron rich reaction product and each electron poor reaction product of each isotopic compound. The change in electron affinity is due to a combination of electronic and zero point energy effects within the molecule. If the reaction is carried out in solution there may be in addition solvent/counter-ion effects.

The following examples illustrate the present invention.

EXAMPLE I

Seventy-five milligrams of a 50/50 by-weight mixture of naphthalene (NP) and naphthalene-d$^8$ (NP-d$^8$) was sealed within a glass capillary tube as reactant. The capillary tube was placed within a glass bulb and a deficient amount of potassium metal, as electron transfer agent, was distilled with the use of a bunsen burner, under vacuum, into the bulb creating a potassium mirror on the sides of the bulb.

Approximately 5 milliliters of tetrahydrofuran (THF) was distilled into the bulb, under vacuum, from a bulb containing THF over sodium-potassium alloy used for drying the THF. After the THF was distilled over, the bulb was sealed and shaken until the capillary tube was broken. The solid naphthalene and naphthalene-d$^8$ were allowed to dissolve. After the solid had dissolved, the bulb was tipped to pour the solution over the potassium mirror. The potassium mirror then dissolved and the solution became a dark green color.

The bulb was then submerged in 600 milliliters of deionized and distilled water and broken open, allowing the solution to react with the water. The reaction of the THF solution provided a Birch reduction of the anion radicals of NP and NP-d$^8$ with water according to the following reaction.

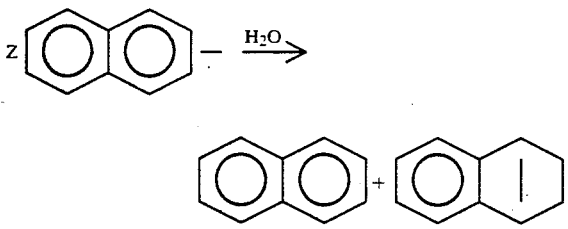

The aqueous solution was transferred to a separatory funnel and washed with diethyl ether. The ether extract was dried over sodium sulphate (Na$_2$SO$_4$). The ether solution was decanted off the drying agent and a fractional distillation performed to remove all except approximately 5 milliliters of the ether. The remaining ether was removed by blowing nitrogen gas over it, leaving an oily mixture.

The oily mixture was dissolved in hexane and placed dropwise in a straight line on a six inch by six inch silica thin layer chromatography plate about 1½ inches from the bottom. The plate was placed in a thin layer chromatography bath filled with hexane to just below the extract line. The thin layer chromatography plate was retained in the thin layer chromatography bath until the hexane reached the top of the plate. A separation of a main portion of the extract from impurities was observed under ultraviolet light.

The neutral aromatic hydrocarbon and the dihydro aromatic hydrocarbon do not separate in the thin layer chromatography, however, they could have been separated by standard techniques relying on liquid chromatography, gas chromatography, solvent solubility or distillation.

The silica of the thin layer chromatography plate containing the main portion of the product was removed from the glass of the chromatography plate, broken into small pieces and dissolved in chloroform. The silica was removed by filtration and the chloroform removed by fractional distillation of all but about 5 milliliters, followed by removal of the remaining chloroform by blowing nitrogen gas over the extract.

The remaining extract was placed in a vacuum sublimator containing dry ice/acetone in its inside tube and the sublimator was connected to vacuum for about two hours. Solid white crystals which collected in the sublimator were removed and placed into a capillary tube, which was then sealed. The above steps were then repeated except that excess potassium was used.

The product of the method was reacted the second time with excess potassium in order to reduce all the naphthalene and naphthalene-d$^8$ present, since the dihydro products do not form anion radicals. An electron spin resonance spectra of the solution was taken and compared to spectra simulated by computer in accordance with: Stevenson, Reiter, and Sedgwick, "Thermal Generation Of The [16]-Annulene Anion Radical From The [8]-Annulene Anion Radical" 105 Journal Of The American Chemical Society 6521, (1983) to provide quantification. A ratio of naphthalene to naphthalene-d$^8$ of 0.8:1 was obtained. Thus there was a greater amount of NP anion radical than NP-d$^8$ anion radical and more NP was converted to the dihydro form than NP-d$^8$.

EXAMPLE II

Seventy-five milligrams of a 50/50 by-weight mixture of naphthalene (NP) and naphthalene-d$^8$ (NP-d$^8$) were sealed within a glass capillary tube as reactant. The capillary tube was placed within a glass bulb and excess potassium metal, as electron transfer agent, was distilled with the use of a bunsen burner, under vacuum, into the bulb creating a potassium mirror on the sides of the bulb.

Approximately 5 milliliters of tetrahydrofuran (THF) was distilled into the bulb, under vacuum, from a bulb containing THF over sodium-potassium alloy used for drying the THF. After the THF was distilled over, the bulb was sealed and shaken until the capillary tube was broken. The solid naphthalene and naphthalene-d$^8$ were allowed to dissolve. After the solid had dissolved, the bulb was tipped to pour the solution over the potassium mirror. The potassium mirror then dissolved and the solution became a dark green color.

The bulb was then submerged in 600 milimeters of deionized and distilled water and broken open, allowing the solution to react with the water.

The reaction of the THF solution provided a Birch reduction of the anion radicals of NP and NP-d$^8$ with water.

The aqueous solution was transferred to a separatory funnel and washed with ethyl ether. The ether extract was dried over sodium sulphate (Na$_2$SO$_4$). The ether solution was decanted off the drying agent and a fractional distillation performed to remove all except approximately 5 milliliters of the ether. The remaining ether was removed by blowing nitrogen gas over it, leaving an oily mixture.

The oily mixture was placed in a sintered glass funnel and washed with 5 ten milliliter aliquots of glacial acetic acid. This removed the dihydro products of the Birch reduction since they are soluble in the acid and the aromatic compounds are not.

The remaining insoluble material was placed in a vacuum sublimator containing dry ice/acetone in its inside tube and the sublimator was connected to vacuum for about two hours. Solid white crystals were collected. An electron spin resonance spectra was taken after complete reduction of the mixture with excess potassium, and compared to spectra simulated by computer in accordance with: Stevenson, Reiter, and Sedgwick, "Thermal Generation Of The [16]-Annulene Anion Radical From The [8]-Annulene Anion Radical" 105 Journal Of The American Chemical Society 6521, (1983) to provide quantification. A ratio of naphthalene to naphthalene-$d^8$ of 1:1 was obtained.

EXAMPLE III

Equal amounts of a 50/50 by-weight mixture of nitrobenzene-14N ($B_zNO_2$) and nitrobenzene-15N ($B_zNO_2$-15) were sealed within a glass capillary tube as reactant. The capillary tube was placed within a glass bulb and potassium metal, as electron transfer agent, was distilled with the use of a bunsen burner, under vacuum, into the bulb creating a potassium mirror on the sides of the bulb.

Approximately 25 milliliters of tetrahydrofuran (THF) was distilled into the bulb, under vacuum, from a bulb containing THF over sodium-potassium alloy used for drying the THF. After the THF was distilled over, the bulb was sealed and shaken until the capillary tube was broken. The $B_zNO_2$ and $B_zNO_2$-15 were allowed to dissolve. After the solid had dissolved, the bulb was tipped to pour the solution over the potassium mirror. The potassium mirror then dissolved and the solution became dark orange color.

The THF was then distilled over into a second evacuated bulb containing excess potassium by connecting the second bulb to the first bulb and placing the second bulb in a dry ice/acetone bath ($-78°$ C.). This left a residue in the first bulb of the solid salts $B_zNO_2$-., $K^+$ and $B_zNO_2$-.-15, $K^+$ and the liquid mixture of $B_zN_2$ and $B_zNO_2$-15. The liquid was then distilled by gentle warming into the bulb containing the excess potassium. An electron spin resonance spectra was taken on the completely reduced nitrobenzenes in the second bulb and compared to spectra simulated by computer in accordance with Stevenson, Reiter, and Sedgwick, "Thermal Generation Of The [16]-Annulene Anion Radical From The [8]-Annulene Anion Radical" 105 Journal Of The American Chemical Society 6521, (1983). The results showed that there was a greater percentage of $B_zNO_2$ than $B_zNO_2$-15.

EXAMPLE IV

Equal amounts of a naturally ocurring mixture of isotopic compounds of bis-diphenyl chromium would be sealed within a glass capillary tube as reactant. The capillary tube would be placed within a glass bulb and potassium metal, as electron transfer agent, would be distilled with the use of a bunsen burner, under vacuum, into the bulb creating a potassium mirror on the sides of the bulb.

Tetrahydrofuran (THF) would be distilled into the bulb, under vacuum, from a bulb containing THF over sodium-potassium alloy used for drying the THF. After the THF would be distilled over, the bulb would be sealed and shaken until the capillary tube would be broken. The solid bis-diphenyl chromium isotopic compounds would be allowed to dissolve. After the solid would have dissolved, the bulb would be tipped to pour the solution over the potassium mirror. The potassium mirror would then be dissolved.

The bulb would then be submerged in 600 milliliters of deionized and distilled water and broken open, allowing the solution to react with the water.

The reaction of the THF solution would provide a Birch reduction of the anion radicals of bis-disphenyl chromium isotopic compounds with water.

The aqueous solution would be transferred to a separatory funnel and washed with ethyl ether. The ether extract would be dried over sodium sulphate ($Na_2SO_4$). The ether solution would be decanted off the drying agent and a fractional distillation performed to remove all except approximately 5 milliliters of the ether. The remaining ether would be removed by blowing nitrogen gas over it, leaving an oily mixture. The oily mixture would be separated by high pressure liquid chromatograph or other chromatographic means and would show the original isotopic ratio modified.

EXAMPLE V

A molecular beam of nitrobenzene would be collided with a molecular beam of potassium to generate gas phase anion radicals which could be reacted to provide an enriched isotopic mixture.

EXAMPLE VI

A solid rod of sodium perchlorate and naphthalene would be made by evaporating a solvent such as tetrohydrofuran from a solution of sodium perchlorate and naphthalene. A DC current would be passed through the rod to generate solid phase anion radicals. The rod would be quenched with water to provide the Birch reduction of the anion radicals. The rod would be submerged in water and dispersed. The aqueous solution would be transferred to a separatory funnel and washed with ethyl ether, dried over sodium sulphate ($Na_2SO_4$). The ether solution would be decanted off the drying agent and a fractional distillation would be performed to remove all except approximately 5 milliliters of the ether. The remaining ether would be removed by blowing nitrogen gas over it, leaving an oily mixture.

The oily mixture would be placed in a vacuum sublimator containing dry ice/acetone in its inside tube and the sublimator connected to vacuum and solid crystals collected, and analyzed by electron spin resonance, mass spectroscopy or other means.

EXAMPLE VII

Twenty milligrams each of normal benzophenone (BZO) and benzophenone containing 2 percent $O^{17}$ ($BZO^{17}$) would be dissolved in dry liquid ammonia, under vacuum, in a container maintained by a dry ice-acetone mixture at a temperature of about 203 K. A small portion of the $BZO/BZO^{17}$ solution produced would be removed and brought into contact with a freshly sublimated sodium (Na) mirror, to reduce solutes to anion radicals. The sodium mirror could be produced by distillation under vacuum of sodium metal into a container to form a sodium mirror on the container.

The anion radical mixture would be returned to the bulk of the $BZO/BZO^{17}$ solution to establish an equilibrium competition between BZO and $BZO^{17}$ for the deficient number of electrons. The ammonia would then be distilled from the mixture.

A container holding the residue of neutral $BZO/BZO^{17}$ and anion radical sodium salt of $BZO/BZO^{17}$ would then be placed in a hot oil bath at 140 degrees C. and the neutral $BZO/BZO^{17}$ molecules sublimed from the mixture and collected in a U tube submerged in a dry ice-acetone mixture.

The neutral BZO/BZO$^{17}$ collected there would be enriched in either O-16 or O-17, and the salts left behind enriched in the other isotope. The procedure could be repeated for the neutral BZO/BZO$^{17}$ collected to provide a further enrichment.

EXAMPLE VIII

Twenty milligrams each of normal benzophenone (BZO) and benzophenone with 99% of the carbonyl carbon substituted with carbon-13 ($C^{13}$-BZO), were dissolved in dry liquid ammonia, under vacuum, in a container maintained by a dry ice-acetone mixture at a temperature of about 203° K. A small portion of the BZO/$C^{13}$-BZO solution produced was removed and brought into contact with a freshly sublimated sodium (Na) mirror, produced by distillation, under vacuum, of sodium metal into a container; to reduce the solutes to anion radicals.

The anion radical mixture was returned to the bulk of the BZO/$C^{13}$-BZO solution, to establish an equilibrium competition between the BZO and $C^{13}$-BZO for the deficient number of electrons. The ammonia was then distilled from the mixture.

A container holding the residue of neutral BZO/$C^{13}$-BZO and the anion radical sodium salt of BZO/$C^{13}$-BZO was then placed in a hot oil bath at 140 degrees C. and the neutral BZO/$C^{13}$-BZO sublimed and collected in a U tube immersed in a dry ice-acetone mixture. Chloroform-d ($CCl_3D$) was then added to a sample of the neutral BZO/$C^{13}$-BZO and a nuclear magnetic resonance (N.M.R.) spectrum was taken. In that N.M.R. spectrum the carbonyl carbon position did not appear to be enriched in carbon$^{13}$ relative to the other ring carbon positions. In order to determine whether an enrichment of carbon$^{13}$ at the ring positions was masking an enrichment of carbonyl carbon13, other N.M.R. spectra were taken.

Another sample of the neutral BZO/$C^{13}$-BZO was mixed with a sample of benzaldehyde, and an N.M.R. spectrum taken. A sample of BZO was mixed with benzaldehyde, and a control N.M.R. spectrum was taken. The relative spectral line intensity ratios for the neutral BZO/$C^{13}$-BZO and the control peaks were compared on the two spectra. The carbonyl carbon$^{13}$ content of the treated sample was found to be increased. The carbon$^{13}$ content at the various ring positions was also found to be increased from natural abundance to a higher value.

EXAMPLE IX

A sample of diethylsulfide (DES) having a natural abundance of sulfur isotopes would be dissolved in excess dichloromethane ($CH_2Cl_2$). A small portion of the DES solution would be removed and placed in a container holding an excess of solid aluminum chloride ($AlCl_3$), to oxidize DES to cation radicals. The $AlCl_3$ would then be removed and the cation radical mixture would be returned to the bulk of the DES solution to establish an equilibrium, which would result in enrichment of sulfur$^{33}$ in either the ionic or the neutral form of DES, and depletion of sulfur$^{33}$ in the other form. The ionic and neutral forms of DES would be separated by distillation of the $CH_2Cl_2$, followed by sublimation of the neutral DES from the salts into a cold trap.

EXAMPLE X

A sample of o-nitrobenzene substituted 18 aza crown 6 (hereinafter "crown ether") would be dissolved in an excess of diethyl ether. The resulting solution, under vacuum, would be placed in a container in contact with an aqueous solution of sodium chloride (NaCl) having a natural abundance of sodium isotopes. A direct current would be transmitted thru electrodes in contact with the organic layer to reduce the crown ether and form anion radicals. The anion radicals would encapsulate sodium ions transferred across the phase boundary, from the aqueous layer into the crown ether, as counterions. The sodium ions would be repeatedly released and recaptured, by the crown ether over a period of time, until an equilibrium as to the sodium isotopes would be established, resulting in the enrichment of sodium$^{23}$ in one phase, and sodium$^{22}$ in the other phase. The equilibrium would be temperature dependent and would be established in a matter of seconds or less at room temperature or an elevated temperature. The NaCl solution and the crown ether solution would then be physically separated, such as by decantation.

EXAMPLE XI

Equal amounts of a 50/50 by-weight mixture of nitrobenzene-$N^{14}$ ($B_zNO_2$) and nitrobenzene-$N^{15}$ ($B_zNO_2$-15) were placed within a glass capillary tube. The capillary tube was placed within a glass bulb and potassium metal, as electron transfer agent, was distilled with the use of a bunsen burner, under vacuum, into the bulb creating a potassium mirror on the sides of the bulb.

Approximately 25 milliliters of tetrahydrofuran (THF) was distilled into the bulb, under vacuum, from a bulb containing THF over sodium-potassium alloy used for drying the THF. After the THF was distilled over, an excess of sodium iodide (NaI) of about ten parts per part of $B_zNO_2$ and ten parts per part of $B_zNO_2$-15 was added to the bulb, to cause formation of strongly ion associated anion radicals in the enrichment equilibrium. The bulb was then sealed and shaken until the capillary tube was broken. The $B_zNO_2$ and $B_zNO_2$-15 were allowed to dissolve. After the solid had dissolved, the bulb was tipped to pour the solution over the potassium mirror. The potassium mirror then dissolved and the solution became dark orange color.

The THF was then distilled over into a second evacuated bulb containing excess potassium by connecting the second bulb to the first bulb and placing the second bulb in a dry ice/acetone bath ($-78$ degrees C.). This left a residue in the first bulb of the solid salts $B_zNO_2$-., $K^+$ and $B_zNO_2$-.-15, $K^+$ and the liquid mixture of $B_zNO_2$ and $B_zNO_2$-15. The liquid was then distilled by gentle warming into the bulb containing the excess potassium. An electron spin resonance spectra was taken on the completely reduced nitrobenzenes in the second bulb and compared to spectra simulated by computer in accordance with Stevenson, Reiter, and Sedgwick, "Thermal Generation Of The [16]-Annulene Anion Radical From The [8]-Annulene Anion Radical" 105 Journal Of The American Chemical Society 6521, (1983). The results showed that there was a greater percentage of $B_zNO_2$-15 than $B_zNO_2$.

While there has been described above in the specification including the examples, embodiments of this invention in connection with specific reactants and the like, it is to be understood that this description is made only by way of example and not as a limitation on the scope of the invention.

What is claimed is:

1. A method of isotope enrichment comprising: providing a reactant, said reactant being a mixture of at least a first isotopic compound and a second isotopic compound of the same reactant, said first isotopic compound having atoms of a first isotope of an element, said second isotopic compound having atoms of a second isotope of said element, said first and second isotopes of said element being nonionically bonded in said reactant, introducing an electron transfer agent into said reactant isotopic mixture to form a reaction mixture, said electron transfer agent facilitating the transfer of electrons interactive with one or more selected nuclei of said reactant, said electron transfer agent being in an amount sufficient upon reaction of said reaction mixture to establish an electron exchange equilibrium between an electron rich reaction product and an electron poor reaction product and being in an amount insufficient upon reaction of said reaction mixture to drive said reaction to completion, reacting said reaction mixture until said equilibrium is established, and separating said electron poor reaction product from said electron rich reaction product.

2. The method of claim 1 wherein said electron poor reaction product has added to it an electron transfer agent, said electron transfer agent facilitating the transfer of electrons interactive with one or more selected nuclei of said electron poor reaction product, said electron transfer agent being in an amount sufficient upon reaction of said electron poor reaction product to establish an electron exchange equilibrium between a second electron rich reaction product and a second electron poor reaction product and being in an amount insufficient upon reaction of said electron poor reaction product to drive said reaction to completion, reacting said electron poor reaction product until said equilibrium is established, and separating said second electron poor reaction product from said second electron rich reaction product.

3. The method of claim 1 wherein said electron rich reaction product has added to it an electron transfer agent, said electron transfer agent facilitating the transfer of electrons interactive with one or more selected nuclei of said electron rich reaction product, said electron transfer agent being in an amount sufficient upon reaction of said electron rich reaction product to establish an electron exchange equilibrium between a second electron poor reaction product and a second electron rich reaction product and being in an amount insufficient upon reaction of said electron rich reaction product to drive said reaction to completion, reacting said electron rich reaction product until said equilibrium is established, and separating said second electron rich reaction product from said second electron poor reaction product.

4. The method of claim 1 wherein said equilibrium is between a substantial amount of an electron rich reaction product and a substantial amount of an electron poor reaction product.

5. The method of claim 1 wherein said reactant is conjugated.

6. The method of claim 5 wherein said reactant is an organic compound.

7. The method of claim 1 wherein said reacting step further comprises an oxidation-reduction reaction.

8. The method of claim 7 wherein said electron transfer agent is added in an amount insufficient for completion of said oxidation-reduction reaction.

9. The method of claim 1 wherein the atoms of said selected nuclei are covalently bonded to said reactant by delocalized covalent bonding.

10. The method of claim 1 wherein said reactant is a reaction intermediate.

11. The method of claim 1 wherein said reactant mixture comprises a naturally occuring mixture of isotopic compounds.

12. The method of claim 1 wherein said electron transfer agent is an electrolytic current.

13. The method of claim 1 wherein said separating step further comprises further reacting said electron rich reaction product and said electron poor reaction product with a second reactant having differential activity for said electron rich form of said compound and said electron poor form of said compound, respectively.

14. The method of claim 1 wherein said electron rich reaction product is anionic.

15. The method of claim 1 wherein said electron rich reaction product is neutral.

16. The method of claim 1 wherein one of said reaction products is a radical.

17. The method of claim 1 wherein one of said reaction products is an anion radical.

18. The method of claim 1 wherein one of said reaction products is a cation radical.

19. The method of claim 1 wherein one of said reaction products is a neutral radical.

20. The method of claim 1 wherein said reactant is nonacidic as defined by the Lowry-Bronstead acid-base definition.

21. The method of claim 1 further comprising the step of dispersing said reactant.

22. The method of claim 21 wherein said dispersing step further comprises solubilizing said reactant isotopic mixture.

23. The method of claim 22 wherein said reactant isotopic mixture is solubilized in a solvent nonreactive with said reactant.

24. The method of claim 1 wherein said reactant is aromatic.

25. The method of claim 1 wherein said electron transfer agent is selected from the group consisting of electrolytic current, oxidizing agents, and reducing agents.

26. The method of claim 1 wherein said reactant molecules have a saturated portion and a unsaturated portion and said selected nuclei are in proximity to said saturated portion.

27. The method of claim 1 wherein said reactant isotopic mixture is in the solid phase.

28. The method of claim 1 wherein said reactant isotopic mixture is interdispersed with an electrolyte and wherein said electron transfer agent is an electrolytic current.

29. The method of claim 1 wherein said reactant is in the gas phase.

30. As a composition of matter, a product prepared in accordance with the method of claim 1.

31. As a composition of matter, a product prepared in accordance with the method of claim 13.

32. The method of isotope enrichment of claim 1 wherein said electron transfer agent is an ion.

33. The method of isotope enrichment of claim 32 wherein said ion is a crown ether compound ion.

34. A method of isotope enrichment comprising providing a reactant, said reactant having a plurality of different isotopes at one or more selected nuclei, firstly transferring sufficient electrons between said isotopes to convert said reactant into a mixture of an electron rich reaction product and an electron poor reaction product, secondly transferring electrons interactive with said selected nuclei between said electron poor reaction product and said electron rich reaction product until an equilibrium is established, and separating said electron poor reaction product and said electron rich reaction product.

35. The method of isotope enrichment of claim 34 wherein said reactant exhibits delocalized electron orbitals which include electron orbitals of atoms including said selected nuclei.

36. The method of isotope enrichment of claim 34 wherein said reactant exhibits resonance.

37. The method of isotope enrichment of claim 34 wherein said first transferring step further comprises an oxidation-reduction reaction.

38. The method of isotope enrichment of claim 34 wherein said first transferring step further comprises introducing an electron transfer agent into said reactant isotopic mixture.

39. The method of isotope enrichment of claim 38 wherein said electron transfer agent is selected from the group consisting of electrolytic current, oxidizing agents, reducing agents, and ionic crown ether compound.

40. As a composition of matter, a product prepared in accordance with the method of claim 34.

41. The method of claim 1 wherein at least one of said electron rich reaction product and said electron poor reaction product is a reaction intermediate.

42. The method of claim 1 wherein said electron rich and electron poor reaction products are selected from the group consisting of corbonium ions, free radicals, carbanions, and carbenes.

43. The method of claim 1 wherein a solid mass is formed of said reactant and a molecule selected from the group consisting of electron poor molecules and electron rich molecules and combinations thereof, and said introducing step includes passing an electrical current through said mass.

44. The method of claim 1 wherein both of said reactant and said transfer agent are in the gas phase, and said reacting step includes the step of colliding a molecular beam of said reactant with a molecular beam of said electron transfer agent to form said electron rich and electron poor reaction products, and allowing said electron rich and electron poor reaction products to reach an equilibrium.

45. The method of claim 1 wherein said reactant is a liquid and said electron transfer agent is a solid which reacts with said reactant to form said electron rich reaction product and said electron poor reaction product.

46. The method of claim 1 wherein said electron transfer agent includes a portion of said reactant which is removed from said reactant mixture and reacted to form a reaction product selected from a group consisting of electron poor reaction products and electron rich reaction products and combinations thereof.

47. The method of claim 1 wherein said providing and introducing steps include removing a portion of said rectant mixture, reducing said portion to provide a reaction product selected from a group consisting of electron rich reaction products and electron poor reaction products and combinations thereof, and returning said portion and said reaction products to the remainder of said reactant mixture prior to the performance of said reacting step.

48. The method of claim 1 wherein said providing step includes dissolving said reactant in a solvent therefore to form one liquid phase, dissolving a salt in a solvent therefore to form another liquid phase, said salt being less than soluble in said one phase than said other phase, said reactant being less soluble in said other phase than in said one phase, combining said phases to form a two-phase solution mixture having a phase boundry, and said introducing steps include passing an electrical current through one of said phases to form an electron rich reaction product and an electron poor reaction product.

49. The method of claim 48 wherein said equilibrium between said electron rich and electron poor reaction products is across said phase boundry.

50. The method of claim 48 wherein said one and other phases are aqueous and organic phases.

51. The method of claim 1 wherein said electron rich reaction product and said electron poor reaction product are in separate phases.

* * * * *